US010939735B2

(12) United States Patent
Grabon et al.

(10) Patent No.: US 10,939,735 B2
(45) Date of Patent: Mar. 9, 2021

(54) COOLING UNIT FOR GENERATING COOLED AREA

(71) Applicant: Carrier Corporation, Palm Beach Gardens, FL (US)

(72) Inventors: Michel Grabon, Bressolles (FR); Pascal Lazzarini, Corebell (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 42 days.

(21) Appl. No.: 16/333,807

(22) PCT Filed: Sep. 21, 2016

(86) PCT No.: PCT/IB2016/001564
§ 371 (c)(1),
(2) Date: Mar. 15, 2019

(87) PCT Pub. No.: WO2018/055430
PCT Pub. Date: Mar. 29, 2018

(65) Prior Publication Data
US 2019/0254394 A1    Aug. 22, 2019

(51) Int. Cl.
*A45B 23/00* (2006.01)
*F24F 5/00* (2006.01)
(Continued)

(52) U.S. Cl.
CPC ............ *A45B 23/00* (2013.01); *F24F 5/0035* (2013.01); *F24F 6/02* (2013.01); *F24F 11/0001* (2013.01);
(Continued)

(58) Field of Classification Search
CPC ........ F24F 5/0035; F24F 6/02; F24F 11/0001; F24F 2221/54; A45B 23/00;
(Continued)

(56) References Cited

U.S. PATENT DOCUMENTS

| 1,092,243 A | 4/1914 | Cole |
| 1,831,825 A | 11/1931 | Schutz |

(Continued)

FOREIGN PATENT DOCUMENTS

| CN | 201480241 U | 5/2010 |
| CN | 102793345 A | 11/2012 |

(Continued)

OTHER PUBLICATIONS

International Search Report for International Application No. PCT/IB2016/001564, International Filing Date Sep. 21, 2016, dated May 19, 2017, 7 pages.

(Continued)

*Primary Examiner* — Joseph F Trpisovsky
(74) *Attorney, Agent, or Firm* — Cantor Colburn LLP

(57) ABSTRACT

Cooling unit (100, 200) including a base (102, 202) having a housing with control components (110, 112, 212), a cooling tower (104, 204) attached to the base (102, 202) at a first end of the cooling tower (104, 204), the cooling tower (104, 204) having an inner flow path and an exterior surface, and an air distribution system (106, 206) attached to the cooling tower (104, 204) at a second end of the cooling tower (104, 204). The air distribution system (106, 206) has a first enclosure (130), a second enclosure (132) defining an air distribution chamber (126) between the first and second enclosures, a cool air dispenser (138) configured in the first enclosure (130), a warm air (142) dispenser configured in the first enclosure (130) at a location different from the cool air dispenser (138), and a cover (144) disposed on an exterior surface of the second enclosure (132). The control components (110, 112, 212) are configured to convey air through the base (102, 202), the cooling tower (104, 204), and the air distribution system (106, 206) to dispense air (Continued)

through the cool air dispenser (138) and the warm air dispenser (142).

20 Claims, 6 Drawing Sheets

(51) Int. Cl.
*F24F 6/02* (2006.01)
*F24F 11/00* (2018.01)
*F28C 1/02* (2006.01)

(52) U.S. Cl.
CPC ........ *F28C 1/02* (2013.01); *A45B 2023/0012* (2013.01); *A45B 2200/1027* (2013.01); *A45B 2200/1036* (2013.01); *F24F 2221/54* (2013.01)

(58) Field of Classification Search
CPC .... A45B 2023/0012; A45B 2200/1027; A45B 2200/1036; A45B 2200/1045; F28C 1/02
See application file for complete search history.

(56) References Cited

U.S. PATENT DOCUMENTS

| | | |
|---|---|---|
| 2,210,458 A | 8/1940 | Keilholtz |
| 2,727,366 A | 12/1955 | Hagen |
| 3,208,236 A | 9/1965 | Frigerio |
| 3,228,317 A | 1/1966 | Westman |
| 4,002,333 A | 1/1977 | Gotoh |
| 4,403,732 A | 9/1983 | Primich |
| 4,765,542 A | 8/1988 | Carlson |
| 5,094,273 A | 3/1992 | Eagleton |
| 5,137,214 A | 8/1992 | Mallery |
| 5,194,048 A | 3/1993 | Briggs |
| 5,263,897 A | 11/1993 | Kondo et al. |
| 5,349,975 A | 9/1994 | Valdner |
| 5,350,337 A | 9/1994 | Kondo et al. |
| 5,503,597 A | 4/1996 | Lochtefeld et al. |
| 5,979,793 A | 11/1999 | Louis |
| 6,017,188 A | 1/2000 | Benton |
| 6,036,603 A | 3/2000 | Mason et al. |
| 6,151,907 A | 11/2000 | Hale |
| 6,158,669 A | 12/2000 | Louis |
| 6,175,969 B1 | 1/2001 | Edwards |
| 6,298,866 B1 | 10/2001 | Molnar, IV |
| 6,682,000 B1 | 1/2004 | Apple |
| 6,886,759 B1 | 5/2005 | Okronick et al. |
| 6,945,868 B2 * | 9/2005 | Gautney ............... F24F 5/0035 454/338 |
| 7,104,270 B2 | 9/2006 | Dong |
| 7,234,653 B2 | 6/2007 | Powell et al. |
| 7,322,208 B1 | 1/2008 | Griffin |
| 7,431,469 B2 | 10/2008 | Li |
| 7,497,225 B1 | 3/2009 | Klein, Jr. et al. |
| 7,513,126 B2 | 4/2009 | Boland |
| 7,537,015 B1 | 5/2009 | Molnar, IV et al. |
| 7,665,477 B1 | 2/2010 | Hathaway |
| 7,871,017 B2 | 1/2011 | Van Zutven |
| 7,950,406 B2 | 5/2011 | Raniere |
| 7,997,561 B2 | 8/2011 | Goldmann et al. |
| 8,061,374 B2 | 11/2011 | Li |
| 8,267,104 B2 | 9/2012 | Li |
| 8,497,656 B2 | 7/2013 | Portis, Jr. et al. |
| 8,695,614 B2 | 4/2014 | Chaimovski et al. |
| 8,727,555 B2 | 5/2014 | Kuelbs |
| 8,753,216 B2 | 6/2014 | Hsieh |
| 8,899,495 B2 | 12/2014 | Chuang |
| 9,010,346 B2 | 4/2015 | Stankiewicz |
| 9,125,462 B2 | 9/2015 | Akin et al. |
| 9,345,295 B2 | 5/2016 | Li |
| 9,488,164 B2 | 11/2016 | Osborn |
| 9,645,611 B2 | 5/2017 | Chen |
| 9,750,318 B2 | 9/2017 | Rao |
| 9,820,540 B2 | 11/2017 | Pan et al. |
| 9,839,267 B1 | 12/2017 | Gharabegian |
| 9,859,748 B2 | 1/2018 | Wang et al. |
| 2004/0221682 A1 | 11/2004 | Watson et al. |
| 2005/0161067 A1 | 7/2005 | Hollins |
| 2005/0172987 A1 | 8/2005 | Byrnes |
| 2005/0247074 A1 | 11/2005 | Ellicott |
| 2006/0091234 A1 | 5/2006 | Wallander |
| 2006/0162368 A1 | 7/2006 | Boland |
| 2007/0092375 A1 | 4/2007 | Liu |
| 2007/0132116 A1 | 6/2007 | Mockry et al. |
| 2008/0006263 A1 | 1/2008 | Seichei et al. |
| 2008/0048051 A1 | 2/2008 | Chang |
| 2008/0056898 A1 | 3/2008 | Li |
| 2008/0179426 A1 | 7/2008 | Johnson |
| 2009/0283606 A1 | 11/2009 | Terrell et al. |
| 2010/0024856 A1 | 2/2010 | Li |
| 2011/0146319 A1 | 6/2011 | Branning |
| 2011/0146542 A1 | 6/2011 | Branning |
| 2012/0028562 A1 | 2/2012 | Heim et al. |
| 2012/0032125 A1 | 2/2012 | Bin |
| 2013/0037254 A1 * | 2/2013 | Carlson ............... H05K 7/20836 165/287 |
| 2013/0075066 A1 | 3/2013 | Reytblat |
| 2014/0048110 A1 | 2/2014 | Stankiewicz |
| 2014/0109610 A1 | 4/2014 | Wulf et al. |
| 2015/0366305 A1 | 12/2015 | Edwards |
| 2016/0119699 A1 | 4/2016 | Caban |
| 2016/0310926 A1 | 10/2016 | Sun et al. |
| 2016/0338457 A1 | 11/2016 | Gharabegian |
| 2016/0340926 A1 | 11/2016 | Barbret |
| 2017/0105497 A1 | 4/2017 | Gharabegian |
| 2017/0018923 A1 | 11/2017 | Gharabegian |
| 2017/0332750 A1 | 11/2017 | Gharabegian |

FOREIGN PATENT DOCUMENTS

| | | |
|---|---|---|
| CN | 102696057 A | 1/2013 |
| CN | 203105923 U | 8/2013 |
| CN | 103438525 A | 12/2013 |
| CN | 203664101 U | 6/2014 |
| CN | 103948224 A | 7/2014 |
| CN | 203762442 U | 8/2014 |
| CN | 203873149 U | 10/2014 |
| CN | 204070887 U | 1/2015 |
| CN | 204079525 U | 1/2015 |
| CN | 104886895 A | 9/2015 |
| CN | 204742896 U | 11/2015 |
| CN | 205040822 U | 2/2016 |
| CN | 105394898 A | 3/2016 |
| CN | 205072237 U | 3/2016 |
| CN | 105476204 A | 4/2016 |
| CN | 105484526 A | 4/2016 |
| CN | 205125314 U | 4/2016 |
| CN | 105581464 A | 5/2016 |
| CN | 205267237 U | 6/2016 |
| CN | 205285314 U | 6/2016 |
| CN | 105725400 A | 7/2016 |
| CN | 105864928 A | 8/2016 |
| CN | 205410042 U | 8/2016 |
| CN | 205512869 U | 8/2016 |
| CN | 205568097 U | 9/2016 |
| CN | 205649066 U | 10/2016 |
| CN | 205649068 U | 10/2016 |
| CN | 205716814 U | 11/2016 |
| CN | 205757722 U | 12/2016 |
| CN | 205831283 U | 12/2016 |
| CN | 206137411 U | 5/2017 |
| CN | 106820504 A | 6/2017 |
| CN | 206314686 U | 7/2017 |
| CN | 107048634 U | 8/2017 |
| CN | 206586516 U | 10/2017 |
| CN | 107341929 A | 11/2017 |
| CN | 206675136 U | 11/2017 |
| CN | 206675145 U | 11/2017 |
| CN | 206699603 U | 12/2017 |
| DE | 19738267 A1 | 4/1998 |
| DE | 202006002144 U1 | 4/2006 |
| DE | 102006053530 A1 | 5/2008 |
| DE | 202011109035 | 3/2013 |

(56) References Cited

FOREIGN PATENT DOCUMENTS

| | | | |
|---|---|---|---|
| DE | 202017003775 | U1 | 8/2017 |
| EP | 1600704 | A1 | 11/2005 |
| EP | 2609827 | A1 | 7/2013 |
| EP | 2722602 | A2 | 4/2014 |
| EP | 3138439 | A1 | 3/2017 |
| FR | 2858188 | A1 | 2/2005 |
| FR | 2863151 | A1 | 6/2005 |
| FR | 2881211 | A1 | 7/2006 |
| GB | 2517786 | | 3/2015 |
| JP | 4366326 | B2 | 12/1992 |
| KR | 20150003655 | A | 1/2015 |
| WO | 2008102403 | A2 | 8/2008 |
| WO | 2010126350 | A1 | 11/2010 |
| WO | 2016175725 | A1 | 11/2016 |
| WO | 2016189457 | A1 | 12/2016 |
| WO | 2017100820 | A1 | 6/2017 |
| WO | 2016055430 | A1 | 3/2018 |

OTHER PUBLICATIONS

Written Opinion for International Application No. PCT/IB2016/001564, International Filing Date Sep. 21, 2016, dated May 19, 2017, 10 pages.

\* cited by examiner

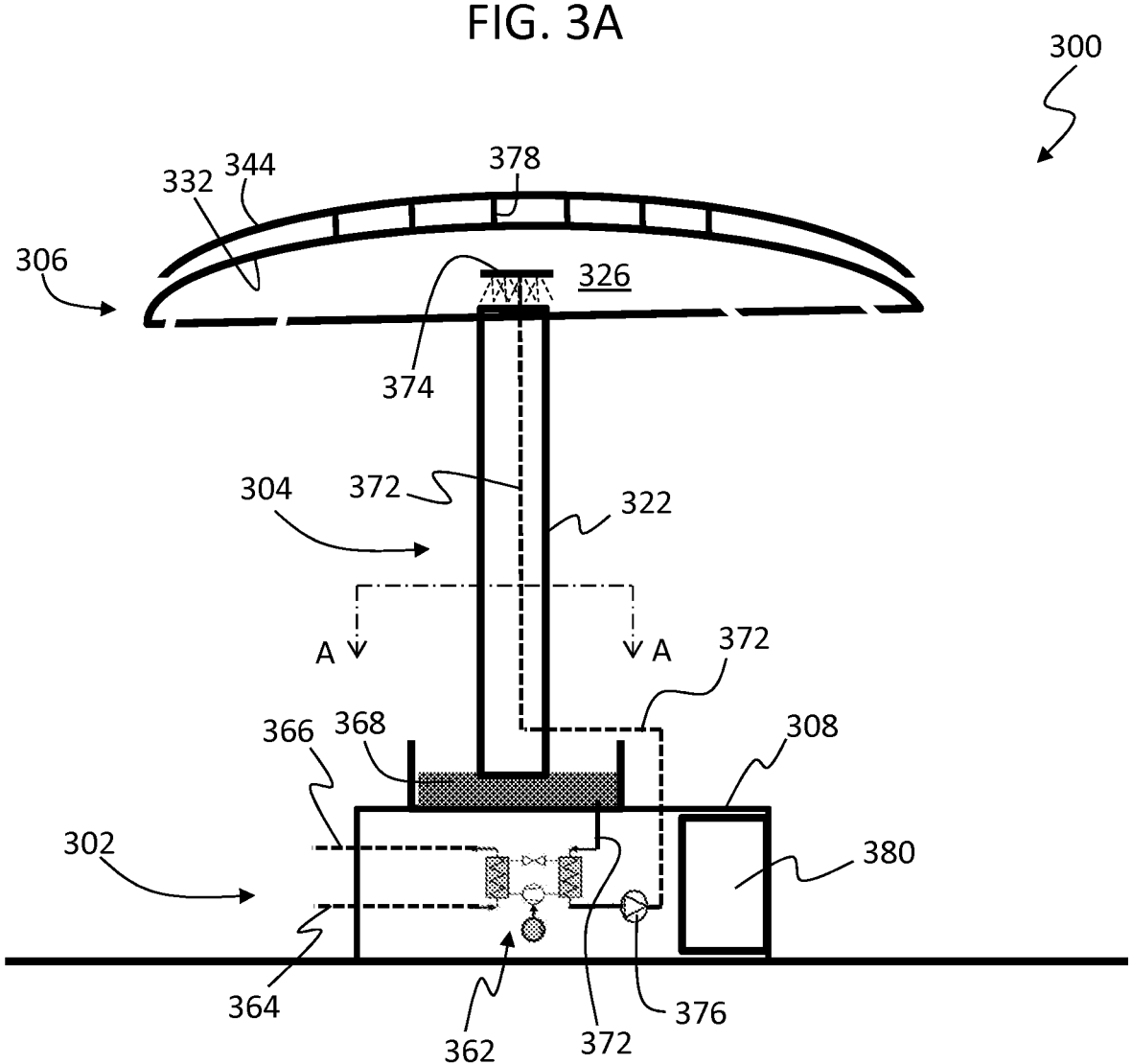
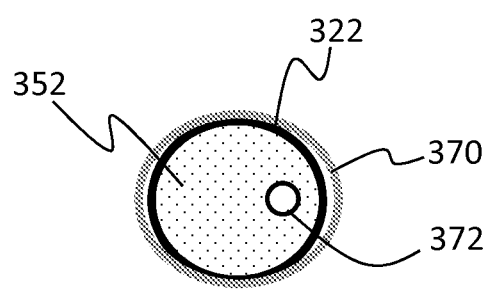

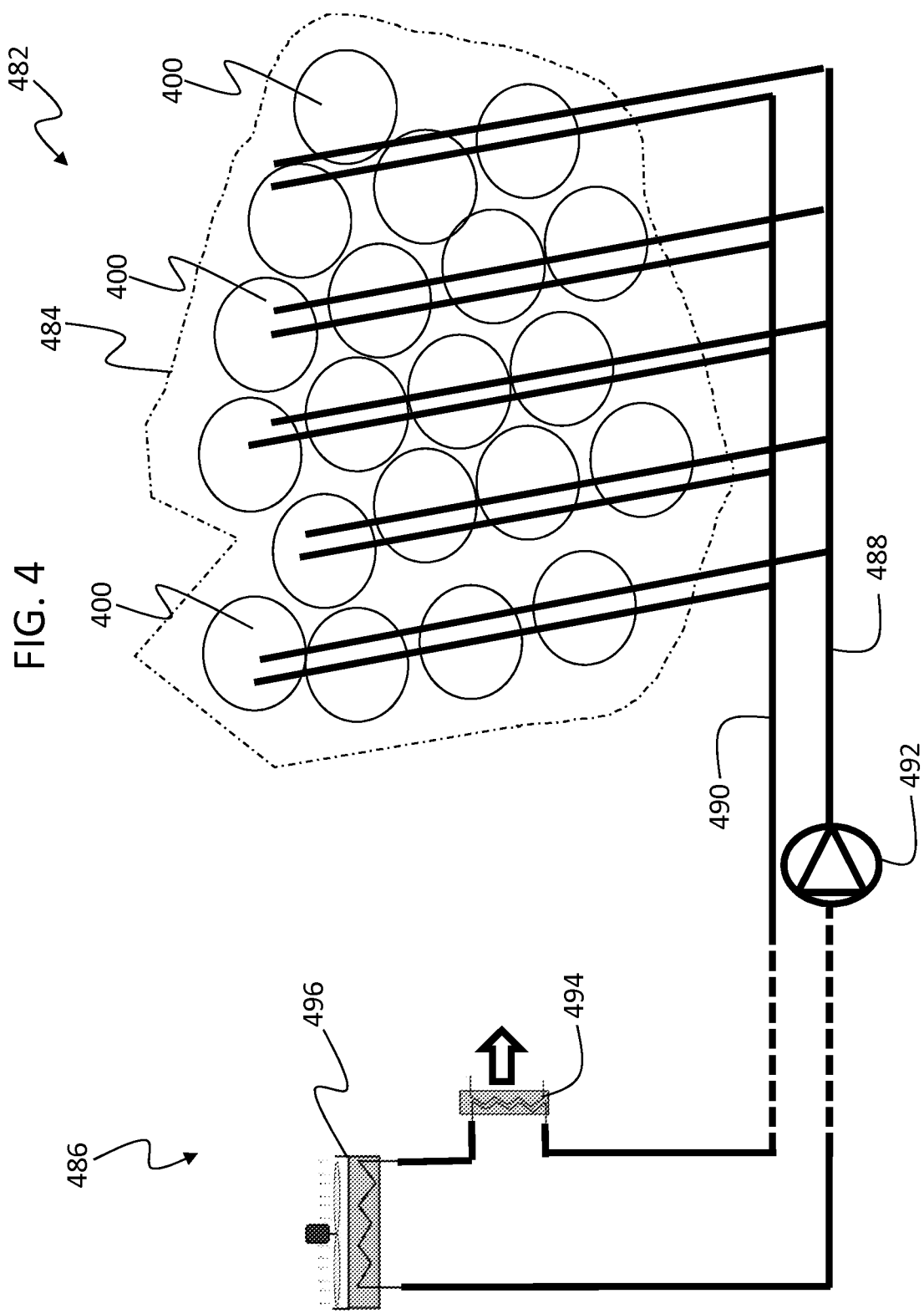

COOLING UNIT FOR GENERATING COOLED AREA

CROSS REFERENCE TO RELATED APPLICATIONS

This is a U.S. National Stage of Application No. PCT/IB2016/001564, filed on Sep. 21, 2016, the disclosure of which is incorporated herein by reference.

BACKGROUND

The subject matter disclosed herein generally relates to cooling units and, more particularly, to cooling units that can be modular and generate cooled areas in proximity to the cooling unit.

Air conditioning and/or cooling for outdoor areas can pose challenges due to moving air currents, thermal transfer, heat dissipation, lack of containment, etc. Accordingly, it may be advantageous to provide cooling units that can enable outdoor cooling in an efficient manner.

SUMMARY

According to one embodiment, a cooling unit is provided. The cooling unit includes a base having a housing with control components installed therein, a cooling tower attached to the base at a first end of the cooling tower, the cooling tower having an inner flow path and an exterior surface, and an air distribution system attached to the cooling tower at a second end of the cooling tower. The air distribution system includes a first enclosure, a second enclosure defining an air distribution chamber between the first and second enclosures, a cool air dispenser configured in the first enclosure, a warm air dispenser configured in the first enclosure at a location different from the cool air dispenser, and a cover disposed on an exterior surface of the second enclosure. The control components are configured to convey air through the base, the cooling tower, and the air distribution system to dispense air through the cool air dispenser and the warm air dispenser.

In addition to one or more of the features described above, or as an alternative, further embodiments of the cooling unit may include a blower located in at least one of the base, the cooling tower, or the air distribution system, the blower configured to move air through the cooling unit.

In addition to one or more of the features described above, or as an alternative, further embodiments of the cooling unit may include a heat exchanger located within the base and configured to cool water that flows through the cooling unit.

In addition to one or more of the features described above, or as an alternative, further embodiments of the cooling unit may include a water dispenser located proximate to the second end of the cooling tower, the water dispenser configured to generate at least one of (i) water droplets that fall through the inner flow path or (ii) a cascade of water that flows down the exterior surface.

In addition to one or more of the features described above, or as an alternative, further embodiments of the cooling unit may include a cooling unit water supply line configured to fluidly connect the water dispenser to the heat exchanger.

In addition to one or more of the features described above, or as an alternative, further embodiments of the cooling unit may include that at least a portion of the cooling unit water supply line passes through the inner flow path.

In addition to one or more of the features described above, or as an alternative, further embodiments of the cooling unit may include that the cover is at least on solar panel, the solar panel configured to supply power to at least the control components.

In addition to one or more of the features described above, or as an alternative, further embodiments of the cooling unit may include a battery located within the base and configured to supply power to at least the control components.

In addition to one or more of the features described above, or as an alternative, further embodiments of the cooling unit may include a first subchamber and a second subchamber formed within the air distribution system, wherein the first subchamber is fluidly connected to the cool air dispenser and the second subchamber is fluidly connected to the warm air dispenser.

In addition to one or more of the features described above, or as an alternative, further embodiments of the cooling unit may include that air within the second subchamber provides cooling to the second enclosure.

In addition to one or more of the features described above, or as an alternative, further embodiments of the cooling unit may include that the control components includes a pump configured to pump water through the cooling unit.

In addition to one or more of the features described above, or as an alternative, further embodiments of the cooling unit may include that at least one of the base or the air distribution system is removably attached to the cooling tower.

In additional embodiments, a cooling system includes a plurality of cooling units in accordance with any of the preceding embodiments.

In addition to one or more of the features described above, or as an alternative, further embodiments of the cooling system may include a heat rejection water system fluidly connected to each of the plurality of cooling units.

In addition to one or more of the features described above, or as an alternative, further embodiments of the cooling system may include that the heat rejection water system includes a heat rejection inlet supply, a heat rejection outlet supply, and a heat rejection pump for pumping water through the heat rejection inlet supply and the heat rejection outlet supply.

In addition to one or more of the features described above, or as an alternative, further embodiments of the cooling unit or cooling system may include a mounted heat rejection unit mounted on the cover and configured to remove condensate from the cooling unit.

Technical effects of embodiments of the present disclosure include cooling units that are modular, energy efficient, and provide cooling for areas (e.g., outdoor areas) that typically cannot be cooled for various reasons.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

FIG. 3A is a schematic illustration of water flow through a cooling unit in accordance with an embodiment of the present disclosure;

FIG. 3B is a cross-sectional illustration of the cooling unit of FIG. 3A along the line A-A;

FIG. 4 is a schematic illustration of a cooling system incorporating a plurality of cooling units in accordance with the present disclosure;

DETAILED DESCRIPTION

Figure 1:
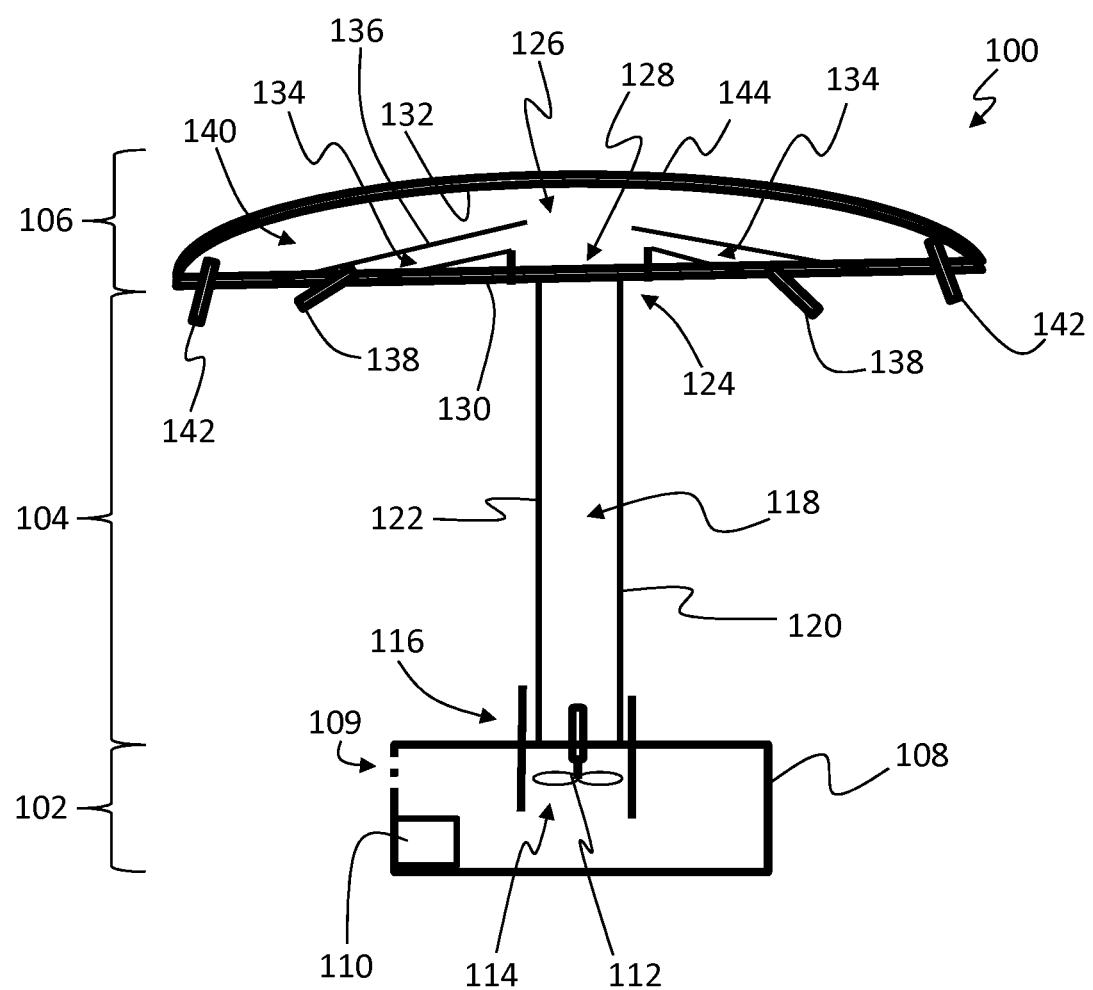
FIG. 1 is a schematic illustration of a cooling unit in accordance with an embodiment of the present disclosure.

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "##" that is shown in FIG. X may be labeled "X##" and a similar feature in FIG. Z may be labeled "Z##." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

Air conditioning and/or cooling for outdoor areas can pose challenges due to moving air currents, thermal transfer, heat dissipation, lack of containment, etc. Embodiments of the present disclosure are directed to portable and/or modular cooling units that can be installed indoors or outdoors that provide regions of cooling air for persons in proximity to the cooling units.

Embodiments provided herein can include one or more mechanisms for providing cooled air to a region in proximity to the cooling units described herein. For example, various embodiments can include local cooling cold waterfalls, integrated or connected power generating sources, air distribution sub-systems, and/or cold water management systems. Embodiments of the present disclosure include a base, a cooling tower extending from the base, and an air distribution system installed at the top of the cooling tower.

For example, turning to FIG. 1, a schematic illustration of a cooling unit 100 in accordance with a non-limiting embodiment of the present disclosure is shown. As shown, the cooling unit 100 includes a base 102, a cooling tower 104, and an air distribution system 106. The cooling unit 100 is configured to employ water cooling to generate cooled or conditioned air that can be distributed from the air distribution system 106 to an area around the cooling unit 100. The components of the cooling unit 100 can be modular, with the cooling tower 104 being removably attached to the base 102 and the air distribution system 106 being removably attached to the cooling tower 104. In some embodiment, a single fixed structure can be formed, and in other embodiment, two of the components can be fixed together, with the third component being removably attached (e.g., fixed base and cooling tower, with changeable and/or exchangeable air distribution systems). Accordingly, the cooling unit 100 is not only module but also customizable.

The base 102, as shown, includes a housing 108 that contains control components 110 and, in the embodiment shown in FIG. 1, a blower 112. The housing 102 of the base 102 is structured and configured to support the cooling tower 104 and the air distribution system 106. Further, the housing 102 can include a first cooling tower connection aperture 114 that enables fluid communication between an interior of the housing 108 and the cooling tower 104 that is mounted to the base 102. As such, in some embodiments, the housing 102 can include framing, supports, etc. that are configured to provide structural rigidity and support to the other aspects of the cooling unit 100. Further, in some configurations the housing 108 can include various exterior features such as seating, cushions, etc. that are designed to enable persons in proximity to the cooling unit 100 to sit within a cooled air zone generated by the cooling unit 100. Further, in some embodiments, the housing 108 can include one or more inlet vents or apertures 109 on an exterior surface of the housing 108 to enable air to flow into the interior of the base 102. Additional connectors or features can be included as described herein and/or as will be appreciated by those of skill in the art without departing from the scope of the present disclosure.

The control components 110 can include electronic controllers (e.g., processors, microprocessors, memory, etc.), switches, motors, pumps, valves, heat exchanger components, etc. that are configured to control operation of the cooling unit 100. For example, the control components 110 include fluid or liquid control components that can be used to direct and control fluid flow into, through, and out of the cooling unit 100. Further, the control components 110 can include a fan controller to control the blower 112 to control a fan speed and/or direction of the blower 112. The controller components 110 can also include sensors or detectors that are configured to, for example, monitor temperatures (e.g., water and/or air temperatures), humidity in proximity to the cooling unit 100, air flow speeds in and through the cooling unit 100, power consumption and/or generation, fluid flows, etc. The sensors of the control components 110 may not be installed in the location schematically shown in FIG. 1, but rather may be installed at various locations in, on, and/or around the cooling unit 100 and may be in communication with a processor or other controller of the control components 110.

As noted, the blower 112 is configured within the cooling tower connection aperture 114 of the housing 108. The blower 112 is configured to direct and move air from the interior of the housing 108 into and through the cooling tower 104. The cooling tower 104, as noted, is mounted to or otherwise installed at a first end 116 (e.g., bottom) to the base 102 such that the cooling tower 104 is supported by the base 102. The cooling tower 104 defines a flow path that is configured to enable fluids (e.g., air, water, etc.) to be moved between the base 102 and the air distribution system 106. For example, as shown in FIG. 1, the cooling tower 104 can include an inner flow path 118 within a conduit 120. As such, the conduit 120 defines a hollow channel to enable air and/or water to be conveyed from the base 102 to the air distribution system 106. The conduit 120 includes an exterior surface 122 that can provide various functionalities as described herein.

Although shown in FIG. 1 with the blower 112 located within the housing 108 of the base 102, this configured is not intended to be limiting. For example, in some alternative configurations, the blower/fan can be configured within the air distribution system at the top of the cooling unit. In such configurations, the blower/fan can be configured to pull air upward through the conduit, rather than pushing the air through the conduit (when positioned at the bottom of the conduit). Further still, in other embodiments, the blower/fan can be mounted and positioned within the cooling tower (e.g., at some vertical position between the base and the air distribution system). Further still, in some embodiments, multiple blowers/fans can be employed and positioned at different locations within the cooling unit.

The air that is passed through the cooling tower 104 is conveyed into the air distribution system 106 that is mounted and/or installed at a second end 124 (e.g., top) of the cooling tower 104. The air distribution system 104 includes various components that are configured to distribute conditioned air to an area or volume surrounding the cooling unit 100. Accordingly, the air distribution system 106 can be open to or otherwise fluidly connected to the conduit 120 such that air and/or water can flow from the flow path 118 into an air distribution chamber 126 defined within the air distribution system 106. That is, the air distribution chamber 126 is fluidly connected to the flow path 118 through a second cooling tower connection aperture 128.

The air distribution chamber 126 is defined between a first enclosure 130 and a second enclosure 132. The first enclosure 130 can include connectors, fasteners, or other mechanisms to rigidly connect and attach the air distribution system 106 to the cooling tower 104. The second enclosure 132 can be fixedly connected to the first enclosure 130 to define the air distribution chamber 126. In other embodiments, the first enclosure 130 and the second enclosure 132 can be integrally formed or molded to define the air distribution chamber 126. In any given configuration, the upper and first enclosures 130, 132 can be relatively fluidly sealed except where defined and required by the particular configuration of the cooling unit 100 (e.g., not sealed at the second cooling tower connection aperture 128 or at other locations as described herein).

The air distribution chamber 126 can be divided into multiple subchambers that are fluidly separated from each other at the first enclosure 130. For example, as shown, a first subchamber 134 is defined within a cool air conduit 136 that is located within the air distribution chamber 126. The cool air conduit 136 fluidly connects the second cooling tower connection aperture 128 to one or more cool air dispensers 138. A second subchamber 140 is defined between the cool air conduit 136 and the second enclosure 132. The second subchamber fluidly connects the second cooling tower connection aperture 128 to one or more warm air dispensers 142. The air dispensers 138, 142 can be nozzles, jets, tubes, holes, or apertures extending through or from or formed in the first enclosure 130. Thus, although shown in FIG. 1 as extending from the first enclosure 130, in some embodiments, the air dispensers 138, 142 can be holes or other structures that are flush with or do not extend from the first enclosure 130.

Also shown in FIG. 1, the second enclosure 132 can include an optional cover 144 on an exterior surface thereof. In some embodiments, the cover 144 can include solar panels or other power generating mechanisms. In other embodiments, the cover 144 can be a paint or coating applied to the exterior surface of the second enclosure 132. In such embodiments, the paint or coating can be used for advertisements, logos, or can have functional effects, such as cooling, energy generation, light reflection, etc. Further, in some embodiments, the cover 144 can be a canvas or other material sheet or similar covering that can be attached to the top of the cooling unit 100. The air within the second subchamber 140 can be in thermal communication with the cover 144 to provide cooling to the cover 140 (e.g., the air in the second subchamber 140 can cool solar panels installed on the second enclosure 132).

Figure 2:
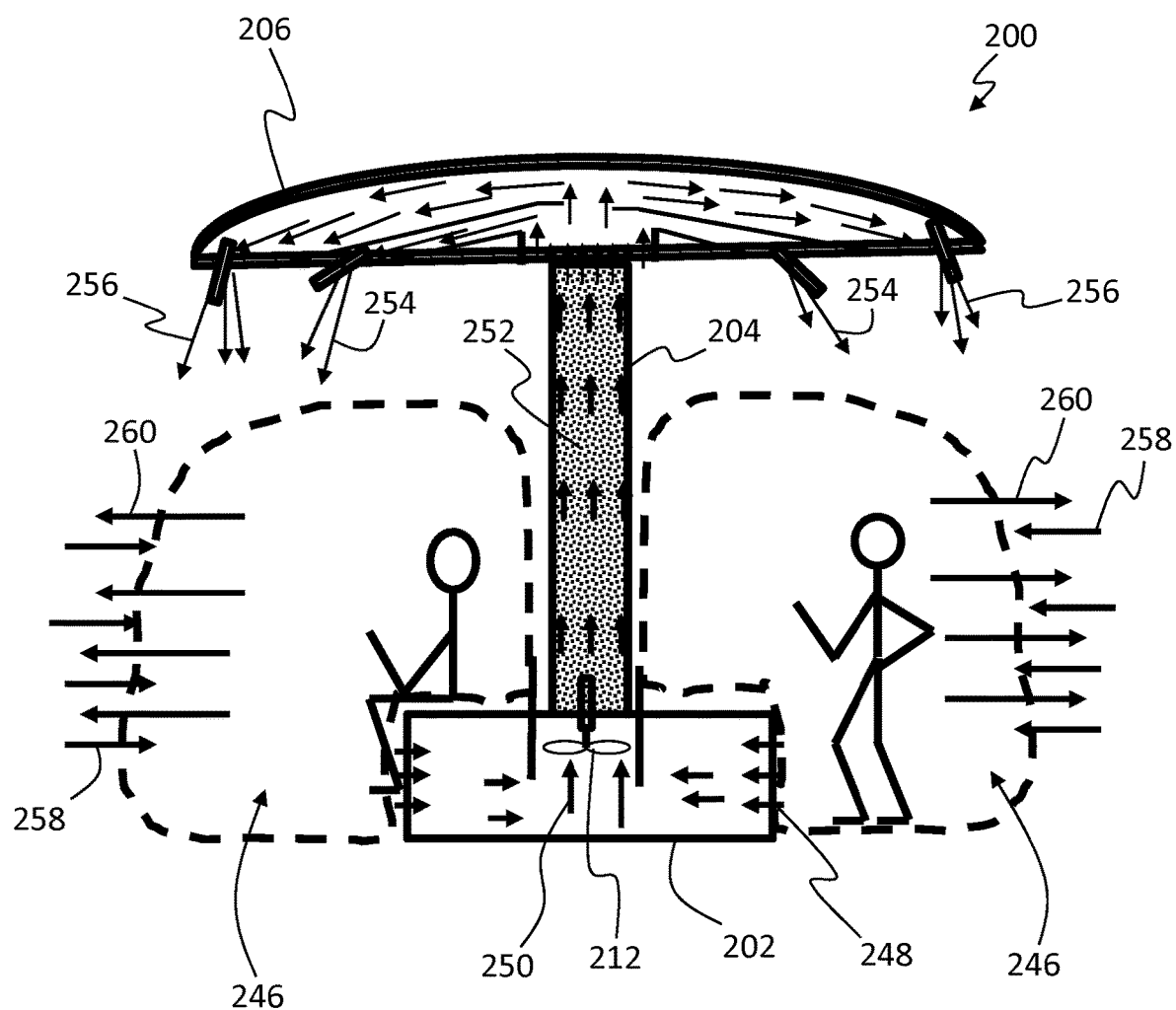
FIG. 2 is a schematic illustration of air flow through a cooling unit in accordance with an embodiment of the present disclosure.

Turning now to FIG. 2, a schematic illustration showing a cooled area 246 that is achieved through operation of a cooling unit 200 in accordance with an embodiment of the present disclosure is shown. That is, FIG. 2 illustrates a non-limiting configuration of an air circuit as produced by operation of cooling units in accordance with embodiments of the present disclosure. The cooling unit 200 is similar to that shown and described with respect to FIG. 1, and thus, for simplicity and clarity of illustration, the same or similar features will not be labeled and described again.

The cooling unit 200 is configured to generate the cooled area 246 through conditioning air within the cooling unit 200 and then dispensing the conditioned air into the cooled area 246 that is defined around the cooling unit 200. For example, the cooled area 246 can be partially contained under the air distribution system 206, which can have a configuration and components similar to that described above.

Operation of the cooling unit 200 can be controlled by control components that are housed within a base 202 of the cooling unit 200, within the air distribution system 206, within a cooling tower 204, and/or by a controller that is remote from the cooling unit 200. In FIG. 2, the dashed lines proximate to the cooling unit 200 define the cooled area 246 which included cooled and/or conditioned air that is dispersed from the cooling unit 200. A blower 212 is operated to pull ambient air 248, e.g., from the cooled area 246, into the housing of the base 202. The air can then be optionally conditioned into conditioned air 250 using a heat exchanger or other air conditioning element(s), as described below. The ambient air 248 can be moist or dry, hot or cold, etc. and the components within the base 202 will either extract moisture or inject moisture, depending on the desired operating conditions, thus generating the conditioned air 250.

The blower 212 will force the conditioned air 250 from the base 202 into the cooling tower 204. Within the cooling tower 204, the conditioned air 250 can be further conditioned by water droplets 252 that cascade or fall from the top of the cooling tower 204 (e.g., second end 124 in FIG. 1) toward the bottom of the cooling tower 204 (e.g., first end 116 in FIG. 1). The water droplets 252 are illustrated as stippling within the cooling tower 204 and the conditioned air 250 is indicated as upward direction arrows within the cooling tower 204. Thus, the conditioned air 250 can be further conditioned by mixing the conditioned air 250 with water in the form of the water droplets 252. In some embodiments, if the conditioned air 250 is not pre-conditioned within the base 202, the conditioning of the conditioned air 250 can be achieved as it passes through the cooling tower 204.

The water droplets 252 can be supplied from the base 202 through one or more fluid supply lines (e.g., see FIGS. 3A-3B). The water droplets 252 can be pre-cooled or pre-chilled using various mechanics, including, but not limited to a heat exchanger within the base 202. Mixing the conditioned air 250 with the water droplets 252 can condition or otherwise "refresh" the air as it passes through the water droplets 252. Such conditioning may have limits based on ambient or outside air wet bulb temperature. Thus, the water of the water droplets 252 can be pre-chilled to a predetermined temperature or temperature range (e.g., 5-7° C. (41-45° F.) to reduce a humidity level of the conditioned air 250.

In addition to pre-cooled or pre-chilled water (e.g., water droplets 252) being dispensed into the cooling tower 204 to condition the conditioned air 250, cool water can be cascaded down an exterior surface of the cooling tower 204. That is, with reference again to FIG. 1, cool water can be cascaded down the exterior surface 122 of the conduit 120, and thus provide local cooling adjacent the cooling tower 104. Accordingly, a cold "waterfall" can be provided on the exterior surface of the cooling tower 204 to enable additional cooling of both the ambient air immediately around the cooling tower 204 and within the conduit of the cooling tower 204.

The conditioned air 250 will then enter into the air distribution chamber of the air distribution system 206. The conditioned air will then move through the air distribution chamber to the first and second subchambers through which the conditioned air can exit the air distribution system at the air dispensers described above. For example, a portion of the conditioned air 250 can enter the first subchamber and exit through the cool air dispensers to provide cool, saturated air 254 (e.g., high moisture content) to the cooled area 246. Simultaneously, another portion of the conditioned air 250 can enter the second subchamber and exit through the warm air dispensers to provide dry, warm air 256 at an exterior or edge of the air distribution system 206. The dry, warm air 256 can define a bounded cooled area 246. The cooled area 246 can thus contain comfortable, conditioned air that may be pleasant to users of the cooling unit 200. As shown, the air may be cycled through the above described operation, wherein new air 258 can be pulled into the system (e.g., into the cooled area 246) and some amount of bleed air 260 will leave the cooled area 246.

With reference to FIGS. 1-2, the dry, warm air 256 that is dispensed from warm air dispensers 142 can be used to, at least in part, contain the cooled area 246. Thus, in some non-limiting embodiments, the warm air dispensers 142 can be angled to optimize this function. For example, the warm air dispensers 142 can be angled perpendicular to or at 90° from the first enclosure 130 (e.g., directly downward). Further, in some embodiments, the cool air dispensers 138 can be angled at a desired angle to provide optimized cool, saturated air 254 into the cooled area 246. For example, the cool air dispensers 138 can be angled at about 45° relative to the first enclosure 130.

Further, in some embodiments, the air dispensers 138, 142 can be passive and the air can be dispensed therefrom based on the velocity and pressure differentials that exist due to thermal gradients, humidity variations, and/or the power of the blower/fan 112/212. Alternatively, one or more of the air dispensers 138, 142 can be powered to accelerate the air as it is expelled from the air distribution chamber 126. For example, in one non-limiting configuration, the warm air dispensers 142 can be powered to generate an air curtain about the cooled area 246 and the cool air dispensers 138 can be powered or unpowered to provide cool air within the cooled area 246.

Turning now to FIGS. 3A-3B, schematic illustrations of a cooling unit 300 in accordance with an embodiment of the present disclosure is shown. The cooling unit 300 is similar to that described above, and thus similar features may not be labeled or discussed again. FIGS. 3A-3B illustrate a non-limiting configuration of a water circuit that is employed by cooling units in accordance with the present disclosure.

As shown, the cooling unit 300 includes a base 302, a cooling tower 304, and an air distribution system 306, similar to that described above. The base 302 includes various components that are part of control components of the cooling unit 300 (e.g., control components 110 of FIG. 1). For example, a housing 308 of the base 302 houses a heat exchange system 362 for providing pre-cooling to water that is employed within the cooling unit 300. In one non-limiting configuration, the heat exchange system 362 can include a water-to-water mini-chiller. A heat rejection inlet line 364 and a heat rejection outlet line 366 are fluidly connected to one portion of the heat exchange system 362 and are configured to extract heat from water that is cycled through the heat exchange system 362. A cooling unit water supply 368 is used for providing the water droplets 352 and exterior cool water 370 described above and shown in FIG. 3B. A cooling unit water supply line 372 can be used to circulate water from the cooling unit water supply 368, through the heat exchange system 362, and to a water dispenser 374 that generates and disperses the water droplets 352 and the exterior cool water 370 from within an air distribution chamber 326 of the air distribution system 306. Further, as shown, a pump 376 can be configured along the cooling unit water supply line 372 to pump the chilled water to the water dispenser 374.

As shown, the cooling unit water supply line 372 is configured within and passes through the interior of the cooling tower 304. In other embodiments, the cooling unit water supply line 372 can be configured in other ways, such as, for example, extending along an exterior surface of the cooling tower 304. However, it may be advantageous to run the cooling unit water supply line 372 through the interior of the cooling tower 304 to provide insulation and cooling to the cooling unit water supply line 372 and/or thermal exchange with conditioned air and/or water droplets passing through the cooling tower.

The various aspects of the cooling unit 300 can be powered by a power source that is part of the cooling unit 300. For example, in some embodiments, the powered components (e.g., heat exchange system 362) can be powered through solar power generation provided by a cover 344 in the form of photovoltaic panels or other solar power generation mechanisms. The cover 344, as shown in FIG. 3A, is supported on a second enclosure 332 of the air distribution system 306 by one or more supports 378. In some embodiments, the supports 378 can be omitted and the cover can be directly applied to or otherwise attached to the exterior surface of the second enclosure 332.

In addition, or alternatively, the cooling unit 300 can be provided with batteries 380 that can be housed within the base 302. The batteries 380 can be configured as electrical power storage devices that store power generated by the solar panels of the cover 344. In other configurations, the batteries 380 can be charged using grid power. Additionally, in some embodiments, the cooling unit 300 can be connected to a generator, grid power, or other power sources as will be appreciated by those of skill in the art.

Turning to FIG. 4, a schematic illustration of a cooling system 482 incorporating multiple cooling units 400 in accordance with the present disclosure is shown. The illustration of the cooling system 482 is a plan schematic view (i.e., looking downward from above). Each of the cooling units 400 can be configured in accordance with the above described embodiments and/or variations thereon. Because of the multiple cooling units 400 the cooling system 482 can define an enlarged cooled area 484 that is generated by the cooling provided each of the individual cooling units 400.

As shown, the cooling units 400 can be arranged such that they can be fluidly connected to a heat rejection water system 486. The heat rejection water system 486 can be fluidly connected to the base of each of the cooling units 400 (e.g., as described above to enable heat exchange within the cooling units). A heat rejection inlet supply 488 can be provided and fluidly connected to the heat rejection inlet line of each individual cooling unit 400. Similarly, a heat rejection outlet supply 490 can be fluidly connected to the heat rejection outlet line of each individual cooling unit 400. The heat rejection inlet and outlet supplies 488, 490 can be used to provide thermal exchange at each cooling unit 400 and thus enable the cooling as described above.

The heat rejection inlet supply 488 can include a heat rejection pump 492 that is configured to convey water through the heat rejection inlet supply 488 and the heat rejection outlet supply 490. The heat rejection outlet supply 490 can be fluidly connected to a hot water network 464 or other water system (e.g., a water utility network) and thus the hot water generated by the cooling units 400 can be recovered and used for other functions. Furthermore, an optional dry cooler 496 can be provided to enable heat absorption to be able to condition the heat rejection water that is provided through the heat rejection inlet supply 488.

Figure 5:
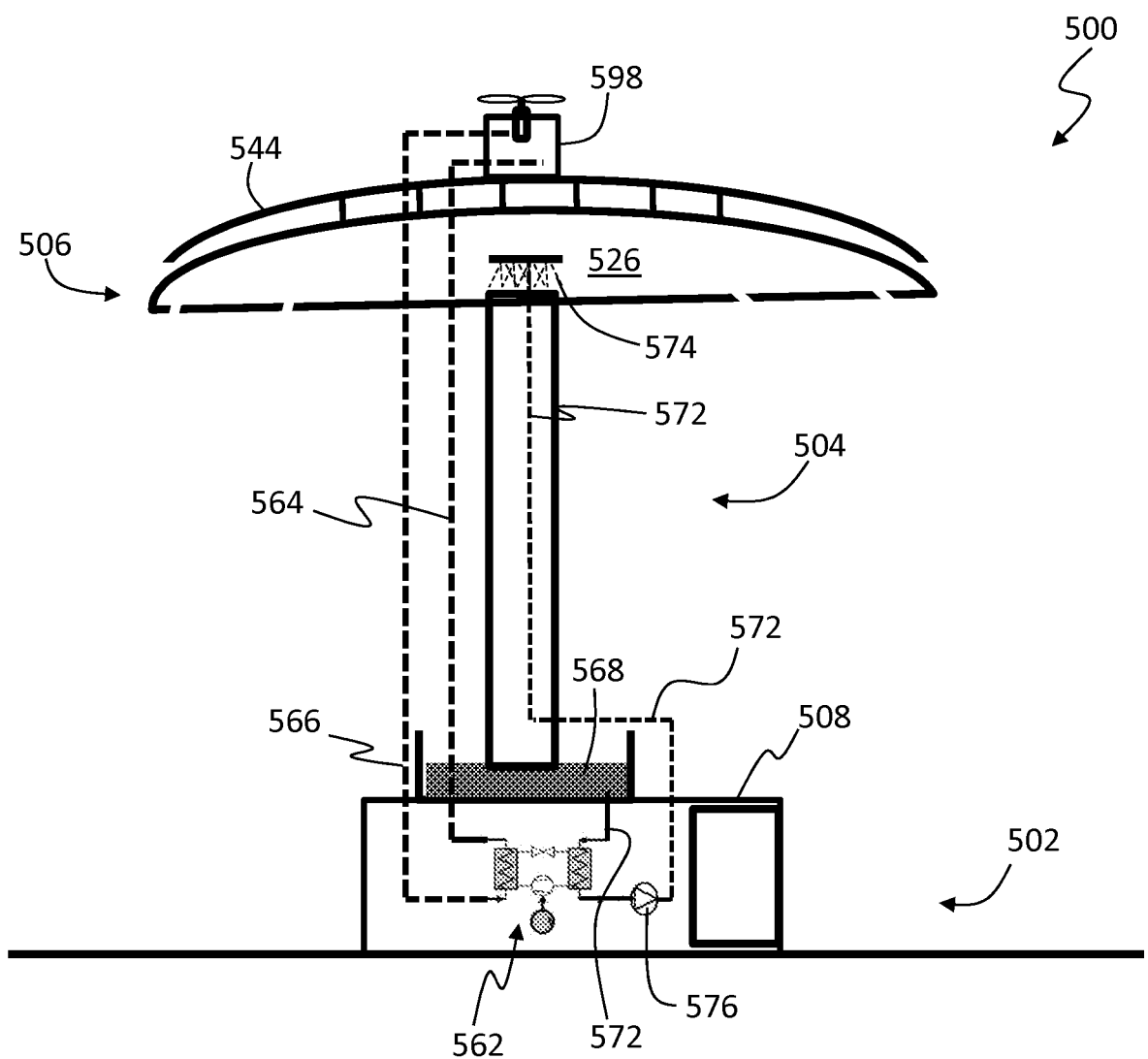
FIG. 5 is a schematic illustration of a cooling unit in accordance with a non-limiting embodiment of the present disclosure.

Turning now to FIG. 5, a schematic illustration of a cooling unit 500 in accordance with an embodiment of the present disclosure is shown. The cooling unit 500 is similar to that described above, and thus similar features may not be labeled or discussed again. FIG. 5 illustrates a non-limiting configuration of alternative configuration of a cooling unit in accordance with the present disclosure.

As shown, the cooling unit 500 includes a base 502, a cooling tower 504, and an air distribution system 506, similar to that described above. The base 502 includes various components that are part of control components of the cooling unit 500 (e.g., control components 110 of FIG. 1). For example, a housing 508 of the base 502 houses a heat exchange system 562 for providing pre-cooling to water that is employed within the cooling unit 500. As shown, the heat exchange system 562 includes a water-to-water mini-chiller. A heat rejection inlet line 564 and a heat rejection outlet line 566 are fluidly connected to one portion of the heat exchange system 562 and are configured to extract heat from water that is cycled through the heat exchange system 562. A cooling unit water supply 568 is used for providing water droplets and exterior cool water from a water dispenser 574. A cooling unit water supply line 572 can be used to circulate water from the cooling unit water supply 568, through the heat exchange system 562, and to the water dispenser 574 within an air distribution chamber 526 of the air distribution system 506. Further, as shown, a pump 576 can be configured along the cooling unit water supply line 572 to pump the chilled water to the water dispenser 574.

In the present configuration, the heat rejection inlet line 564 and the heat rejection outlet line 566 are locally contained such that the cooling unit 500 can be self-contained, in contrast to the above described embodiments that are fluidly connected to a centralized heat rejection system. For example, as shown in FIG. 5, the heat exchange system 562 can include a mounted heat rejection unit 598, such as a dry cooler, located on the cooling unit 500. For example, as shown in FIG. 5, the mounted heat rejection unit 598 can be mounted on or above the air distribution system 506 (e.g., on top of a cover 544). Advantageously, such configuration can eliminate the need for local infrastructure (e.g., no need for a water piping network). The mounted heat rejection unit 598 can include a fan, blower, cooling tubes, cooling finds, or other heat transfer and diffusing mechanisms.

Figure 6:
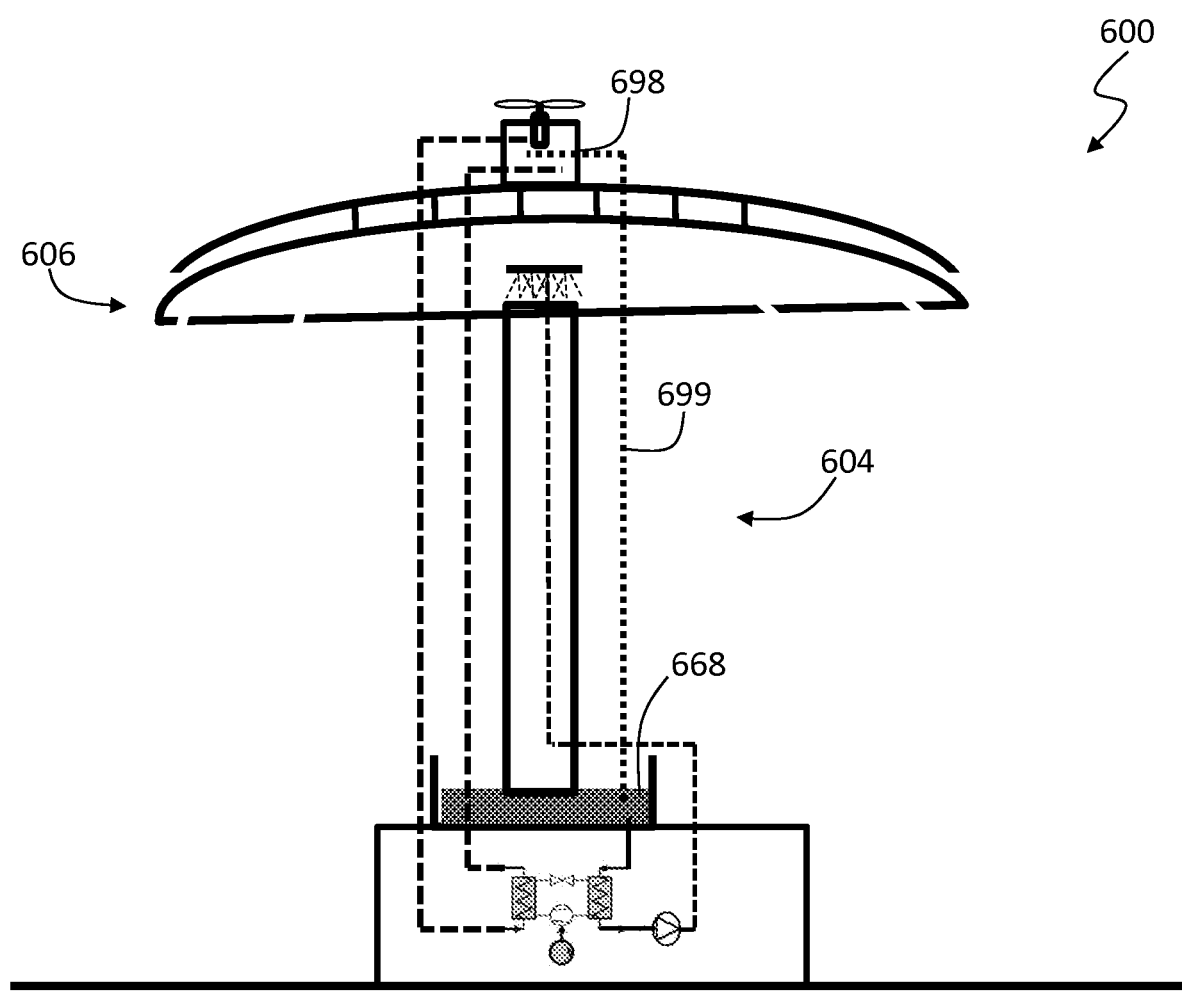
FIG. 6 is a schematic illustration of a cooling unit in accordance with another non-limiting embodiment of the present disclosure.

Turning now to FIG. 6, another alternative configuration of a cooling unit 600 in accordance with an embodiment of the present disclosure is shown. The cooling unit 600 may be employed in situations where I ambient conditions provide excess water in the system (e.g., water contained in humid air will condensate in cold water in cooling tower and in external water fall). Accordingly, a condensate evacuation system 699 can be configured to extract and dispose of the excess water, e.g., from the cooling unit water supply 668. Such condensate evacuation system 699 can be employed in any of the above described embodiments, or variations thereon, although the cooling unit 600 of FIG. 6 is illustrated similar to that shown in FIG. 5, the condensate evacuation system 699 is not so limited.

In one non-limiting configuration, the condensate water may be pressurized to direct the condensate water to a mounted heat rejection unit 698 (e.g., similar to that shown in FIG. 5). Advantageously, such configuration can evacuate excess water to the air above an air distribution system 606 (e.g., no need for connection to heat rejection system) and the efficiency and/or effectiveness of the mounted heat rejection unit 698 can be improved (e.g., the condensate water can lower entering air temperature).

As described herein, individual cooling units are provided that can generate a cool air region or area around the cooling unit. In accordance with various embodiments of the present disclosure, the cooling units can be modular or separable into the different components. For example, the base, the cooling tower, and the air distribution system can all be physically separated for transportation and ease of installation. Further, such modularity enables delivering and providing cooled air in areas that typically may not be able to have cooled air.

Advantageously, embodiments provided herein can employ photovoltaic solar panels and energy storage batteries for self-sufficient power. As such, the cooling units of the present disclosure can be energy neutral or energy positive (e.g., through use of energy generation and hot water generation). Further, advantageously, the air distribution system of cooling units of the present disclosure can provide shade or shadow to the cooled area immediately around the cooling unit and, as noted above, can provide any required electrical energy to operate cooling unit.

Further, advantageously, the air management systems of cooling units described herein can provide cold saturated air streams due to heat and mass exchange between the air and the cold waterfall that is formed on the cooling tower. Further, dividing the output conditioned air can enables a cold and saturated portion of air which can be injected to a comfort zone in the vicinity of the cooling unit (e.g., from the first subchamber). Further, the air that passes through the second subchamber can provide cooling for solar panels which are installed on the exterior surface of the air distribution system. Advantageously, such cooling can increase solar panel effectiveness. Such air will become warm and dry (e.g., reheating). The two separate streams, once mixed after exiting the air distribution system, can have a temperature and humidity which provides optimized comfort for persons within the cooled air area around the cooling unit. Further, the two mixed air streams can provide an air curtain function which will create a comfortable zone for people in cooled area.

Further, cold water management functionality can be contained within the cooling unit and can include a small modular water-cooled chiller, and a cold-water pumping, spraying, and delivery system, as described above. Hot water management functionality can include a heat rejection system which will be connected to a heat evacuation network (e.g., heat rejection system). Advantageously, evacuated heat may be reused for various purposes, including sanitary hot water, or can be rejected to ambient air with a dry cooler or cooling tower that is remote from the cooling units.

Advantageously, the cooling units of the present disclosure can be powered with solar energy and be "green." Further, advantageously, the cooling units of the present disclosure can be modular and can be easily reconfigured based on various requirements (e.g., customer requirements, geography, available space, available water supplies, etc.).

Further, advantageously, the cooling units of the present disclosure can be configured in various geometric or aesthetic designs. That is, although shown and described as an umbrella shape, in accordance with various embodiments, the cooling units can be designed in such way that it is incorporated in an aesthetic manner relative to a location in which it is installed. For example, the cooling tower and air distribution system can be shaped into the form of a palm tree, an umbrella, or other architectural form. In the example of a palm or other tree configuration, the air dispensers can be configured at the ends of "branches" or "leaves" and the subchambers can be within the "branches" or "leaves." Thus, the above description and illustrations are not intended to be limiting.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

What is claimed is:

1. A cooling unit comprising:
a base having a housing with control components installed therein;
a cooling tower attached to the base at a first end of the cooling tower, the cooling tower having an inner flow path and a tower exterior surface; and
an air distribution system attached to the cooling tower at a second end of the cooling tower, the air distribution system including:
a first enclosure;
a second enclosure defining an air distribution chamber between the first and second enclosures;
a cool air dispenser configured in the first enclosure;
a warm air dispenser configured in the first enclosure at a location different from the cool air dispenser; and
a cover disposed on an enclosure exterior surface of the second enclosure,
wherein a first subchamber and a second subchamber are formed within the air distribution system, the first subchamber fluidly connected to the cool air dispenser and the second subchamber fluidly connected to the warm air dispenser,
wherein the control components are configured to convey air through the base, the cooling tower, and the air distribution system to dispense air through the cool air dispenser and the warm air dispenser.

2. The cooling unit of claim 1, further comprising a blower located in at least one of the base, the cooling tower, or the air distribution system, the blower configured to move air through the cooling unit.

3. The cooling unit of claim 1, further comprising a heat exchanger located within the base and configured to cool water that flows through the cooling unit.

4. The cooling unit of claim 1, further comprising a water dispenser located proximate to the second end of the cooling tower, the water dispenser configured to generate at least one of (i) water droplets that fall through the inner flow path or (ii) a cascade of water that flows down the tower exterior surface.

5. The cooling unit of claim 3, further comprising a cooling unit water supply line configured to fluidly connect the water dispenser to the heat exchanger.

6. The cooling unit of claim 5, wherein at least a portion of the cooling unit water supply line passes through the inner flow path.

7. The cooling unit of claim 1, wherein the cover comprises at least one solar panel, the at least one solar panel configured to supply power to at least the control components.

8. The cooling unit of claim 1, further comprising a battery located within the base and configured to supply power to at least the control components.

9. The cooling unit of claim 1, wherein air within the second subchamber provides cooling to the second enclosure.

10. The cooling unit of claim 1, wherein the control components includes a pump configured to pump water through the cooling unit.

11. The cooling unit of claim 1, wherein at least one of the base or the air distribution system is removably attached to the cooling tower.

12. A cooling system comprising a plurality of cooling units in accordance with claim 1.

13. The cooling system of claim 12, further comprising a heat rejection water system fluidly connected to each of the plurality of cooling units.

14. The cooling system of claim 13, wherein the heat rejection water system includes a heat rejection inlet supply, a heat rejection outlet supply, and a heat rejection pump for pumping water through the heat rejection inlet supply and the heat rejection outlet supply.

15. The cooling system of claim 12, further comprising a mounted heat rejection unit mounted on the cover of each cooling unit and configured to remove condensate from a respective cooling unit.

16. The cooling unit of claim 1, further comprising a mounted heat rejection unit mounted on the cover and configured to remove condensate from the cooling unit.

17. A cooling unit comprising:
- a base having a housing with control components installed therein;
- a cooling tower attached to the base at a first end of the cooling tower, the cooling tower having an inner flow path and a tower exterior surface; and
- an air distribution system attached to the cooling tower at a second end of the cooling tower, the air distribution system including:
  - a first enclosure;
  - a second enclosure defining an air distribution chamber between the first and second enclosures;
  - a cool air dispenser configured in the first enclosure;
  - a warm air dispenser configured in the first enclosure at a location different from the cool air dispenser; and
  - a cover disposed on an enclosure exterior surface of the second enclosure,
- wherein the control components are configured to convey air through the base, the cooling tower, and the air distribution system to dispense air through the cool air dispenser and the warm air dispenser; and
- a mounted heat rejection unit mounted on the cover and configured to remove condensate from the cooling unit.

18. The cooling unit of claim 17, further comprising a blower located in at least one of the base, the cooling tower, or the air distribution system, the blower configured to move air through the cooling unit.

19. The cooling unit of claim 17, further comprising a heat exchanger located within the base and configured to cool water that flows through the cooling unit.

20. The cooling unit of claim 17, further comprising a water dispenser located proximate to the second end of the cooling tower, the water dispenser configured to generate at least one of (i) water droplets that fall through the inner flow path or (ii) a cascade of water that flows down the tower exterior surface.

* * * * *